April 8, 1930.  J. E. BODA  1,753,198
DISK HARROW
Filed Jan. 22, 1923   3 Sheets-Sheet 1

Inventor:
Joseph E. Boda
by L. C. Shonts
Atty.

April 8, 1930.  J. E. BODA  1,753,198
DISK HARROW
Filed Jan. 22, 1923  3 Sheets-Sheet 3

Inventor:
Joseph E. Boda
by J. C. Shonts
Atty.

Patented Apr. 8, 1930

1,753,198

UNITED STATES PATENT OFFICE

JOSEPH E. BODA, OF MOLINE, ILLINOIS, ASSIGNOR, BY MESNE ASSIGNMENTS, TO MINNEAPOLIS-MOLINE POWER IMPLEMENT COMPANY, OF MINNEAPOLIS, MINNESOTA, A CORPORATION OF DELAWARE

DISK HARROW

Application filed January 22, 1923. Serial No. 614,181.

This invention relates to disk harrows.

It relates particularly to tandem disk harrows for use with tractors.

One of the big problems in building tandem disk harrows is to be able to produce a satisfactory harrow having a simple and inexpensive construction. The disk gangs must be mounted so that they can be angled from working to transport position and, in a tandem harrow, this involves angling the rear gangs in the opposite direction to the front gangs. When working, the rear gangs must be held so that they will not follow exactly in the paths of the front gangs but in paths such that they will cut the ground left by the front gangs. The controls for the harrow must be such that they can be manipulated easily from the front of the harrow so that an operator on a tractor can reach them.

Certain constructions have been produced which include a rigid frame on which the disk gangs are mounted. This frame holds the gangs rigidly in place relative to one another and the matter of proper trailing can be controlled but the difficulty is that the frames involve using more material and, in addition, they make the harrow difficult to handle because, in transporting it to and from the field, it usually has to be loaded on a wagon or other vehicle. A big heavy frame is very inconvenient and it requires several men to handle it. It is highly desirable to have a frameless harrow, that is, one in which the disk gangs are merely connected together by links and the like. This lightens the construction and enables the disk gangs to be handled separately or in pairs. The difficulty with frameless tandem disk harrows is that it is difficult to get the rear gangs to trail the front gangs properly, it is difficult to prevent the ends of the gangs from digging into the ground, and it is difficult to keep the gangs from jerking back and forth. The present invention comprehends the production of a frameless disk harrow that will solve these difficulties, particular attention being given to making the harrow out of a minimum number of simple parts.

The general object of the invention is to provide an improved and simplified tandem disk harrow.

A more specific object is to provide a tandem disk harrow in which the rear gangs will be positively held in proper trailing position behind the front gangs.

A further object is to provide a simplified means for angling the gangs of a tandem disk harrow.

Other objects and advantages will appear from the specification and drawings.

An embodiment of the invention is shown in the accompanying drawings in which.

Figure 1:
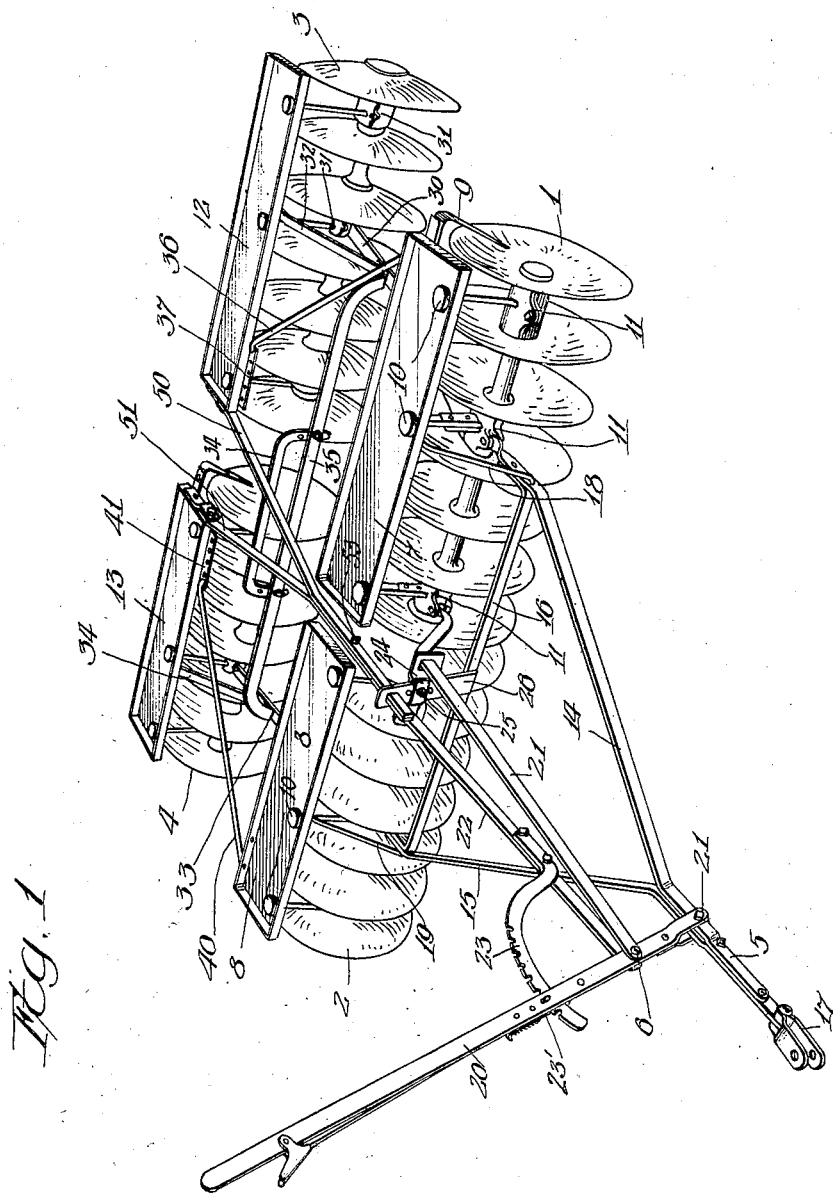
Figure 1 is a perspective view of the harrow in transport position.

In general, the harrow includes right and left front disk gangs 1 and 2, right and left rear disk gangs 3 and 4, draft connections 5 for the front pair of gangs, an angling means 6 for the front gangs, and special draft and angling connections between the front and rear gangs which will be later described.

Each of the front gangs is made up of a series of disks mounted on a suitable shaft, the right and left gangs being provided with weight boxes 7 and 8 respectively for the reception of weights of any suitable kind to vary the depth of penetration of the disks. Each disk gang is provided with a series of scrapers 9 for cleaning the disks and a series of oilers 10 which project through the weight boxes and are connected with the bearings 11. The position of these oilers makes it convenient to fill them and adjust them for forcing lubricant into the bearings. The disks of the right gang are mounted on their shaft in an opposite direction to those of the left gang so that both gangs tend to throw dirt outwardly from the center. The reaction tends to cause the gangs to move longitudinally toward each other. Bumpers (not shown) are provided on the disks at the inner ends of the gangs, which may be of any suitable construction well known in the art.

The rear disk gangs are constructed similar to the front gangs and the right and left gangs carry respectively the weight boxes 12 and 13. The disks of the right rear gang are mounted oppositely to those of the left rear gang so that both gangs tend to throw inwardly, this action being opposite to the action of the front gangs.

The draft connections 5 comprise two metal bars 14 and 15, one pivoted to a bearing 11 on the right gang and the other to a similar bearing on the left gang. The two bars are joined by a U-shaped brace 16 and they converge forwardly and are connected together and to a clevis 17. Bracing rods 18 and 19 are connected from the draft bars 14 and 15 to the weight boxes 7 and 8 for the purpose of steadying and bracing the front disk gangs and for holding them in correct upright position.

The angling means for the front gangs comprises an angling lever 20 pivoted to the draft bars 14 and 15 at the point 21, so that its upper end is in a convenient position for manipulation by an operator seated on the driver's seat of a tractor to which the harrow may be connected. The angling lever is connected by links 21 and 22 with the inner ends of the right and left front gangs respectively. The link 22 carries a sector 23 with which cooperates a latch 23' carried by the lever 20. When the lever 20 is moved rearwardly from the position shown in Figure 1 to that in Figure 2, the inner ends of the front gangs are pushed backwardly to the position illustrated in Figure 2. During this movement, the gangs turn about the bearings to which the draft bars 14 and 15 are connected.

The links 21 and 22 of the angling means pass through openings in a member 24 pivoted loosely by a bolt or the like which passes through one of a series of holes 25 to a standard 26 mounted on the cross brace 16 of the draft connections. The openings in a member 24 are larger than the cross section of the bars 21 and 22 so that these bars have a limited amount of movement independently of the member 24, but, if one of the disk gangs should be at a higher level than the other, the member 24 will be moved to an angular position, the downward movement of the inner end of one gang tending to raise the inner end of the other gang. This ties the inner ends together to a certain extent and secures a more uniform action over irregular ground.

The right rear gang 3 is connected to the right front gang 1 by a draft connection 30, which is pivoted to one of the bearings 11 on the right front gang and to the bearings 31 on the right rear gang. This draft connection is preferably located at an angle to the longitudinal axis of the harrow. A brace rod 32 connects the weight box 12 with the draft connection to steady the right rear gang and hold it in position.

The left rear gang is connected to the left front gang by a similar draft connection 33 pivoted to a bearing on the left front gang and to a bearing on the left rear gang. This draft connection is also located at an angle to the longitudinal axis of the harrow. A brace 34 connects the weight box 13 with the draft connection 33 to steady the left rear gang and to prevent it from turning bodily about its axis.

A spacing member 35 connects the right and left draft connections 30 and 33 to hold them in proper spaced relation and to prevent the rear disk gangs from moving to and away from one another.

An angling connection 36 connects the outer end of the front right gang with the inner end of the rear right gang. This connection is illustrated as comprising a link pivoted in any one of a series of holes in a plate 37 on the weight box 12 of the right rear gang and in a similar plate, not shown, on the weight box of the right front gang. This link is at an angle relative to the longitudinal axis of the harrow, but the angle is opposite to and preferably greater than that of the draft connection 30. The principal function of this link is to angle the rear gang. It comprises, in combination with the draft link 30, a cross link connecting means between the front and rear gangs with one of the links at a greater angle than the other and with one acting to transmit the most of the draft between the front and rear gangs and the other acting mainly to angle the gangs.

An angling connection 40 extends between the inner end of the left rear gang and the outer end of the left front gang, such connection being similar to that of the right gangs and comprising a link pivoted in one of the series of holes in a plate 41 on the weight box 13 of the left rear gang and in a similar plate, not illustrated, on the weight box 8 of the left front gang.

The construction of the angling connections for both sets of gangs is such that the connections may be adjusted to obtain different angular relations between the gangs. For example, the draft links 36 and 40 may be connected in different holes in the plates 37 and 41 and in the corresponding plates on the front gangs to vary the angling effect of the front gangs on the rear gangs.

The operation of the harrow is as follows:

When the harrow is being drawn forward in transport position, as illustrated in Figure 1, the draft is transmitted from the tractor to the front gangs through the draft connections. The right rear gang is pulled by the right front gang through the draft connection 30 and the left rear gang is pulled by the left front gang through the draft connection 33.

When it is desired to angle the harrow to working position, the lever 20 is pushed backward. This pushes the inner ends of the front pair of gangs rearwardly, such gangs moving about the pivots 11 to which the draft bars 14 and 15 are connected. As the inner ends of the front pair of gangs move rearwardly, their outer ends move forwardly, and as their outer ends move forwardly, they pull the inner ends of the rear pair of gangs forwardly by means of the angling connections 36 and 40. The gangs may be locked in the desired angular relation by the latch 23', which cooperates with the sector 23. Each rear gang is angled positively by its corresponding front gang.

One of the difficulties with tandem disk harrows has been in making the rear pair of gangs trail the front pair of gangs in proper relation. The rear pair tends to sway or swing out of position, so that the disks of the rear pair run in the tracks left by the front pair instead of cutting the ground left uncut by the front pair. It will be appreciated that any construction which is designed to secure proper trailing relation must take into account the question of the proper flexibility of the harrow, the question of angling the gangs efficiently and easily, and the question of turning the harrow in the field.

One of the important features of the present invention is that it positively holds the rear gangs in proper trailing relation to the front gangs without destroying the flexibility of the harrow. It also permits the gangs to be easily angled and the harrow to be turned in the field.

Figure 2:
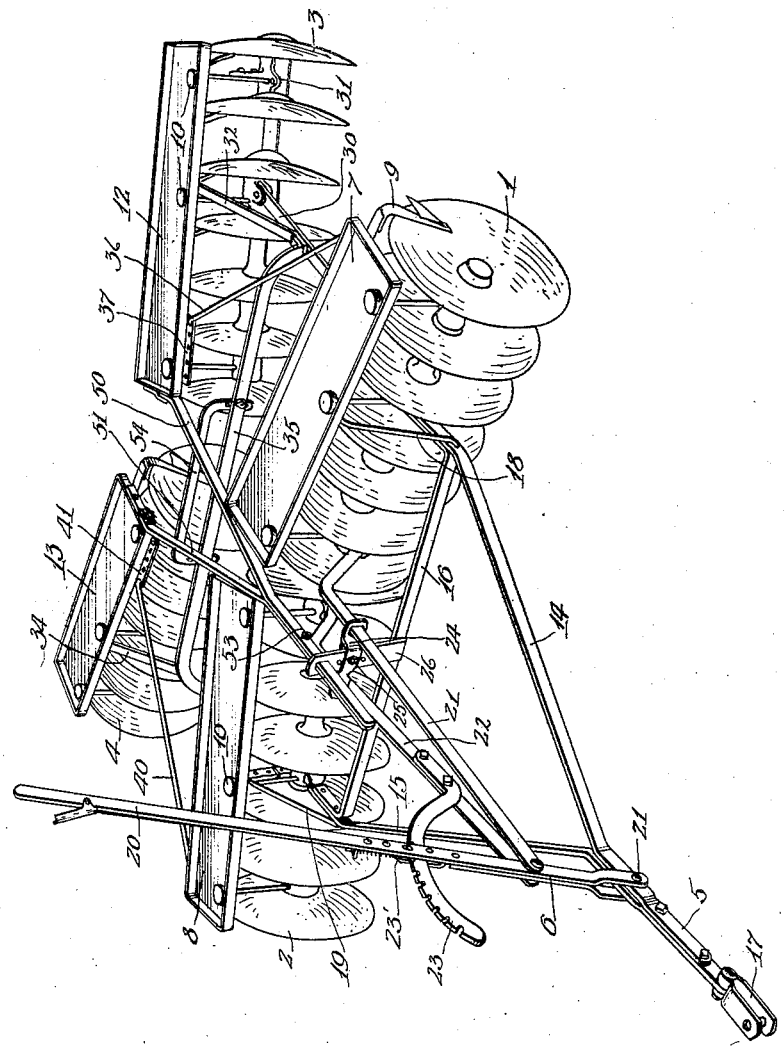
Figure 2 is a perspective view of the harrow in working position.

The manner in which the rear gangs are held in proper trailing relation to the front gangs will be clear by referring to Figure 2. Assume that the rear pair of gangs tends to move to the right. If the gangs were free to move to the right, they would pivot about the connections of the draft members 30 and 33 to the front gangs, but they cannot so move because of the angling connections 36 and 40. A tendency to move to the right places a tension on the angling link 40 and a compression on the angling link 36. If the draft and angling links were the only connections between the gangs, there might be a tendency, when the rear gangs tended to move to the right, to collapse the link connection, causing the rear gangs to move rearwardly relative to the front gangs. But this movement cannot take place because the spacing brace 35 holds these links rigidly in position, so that no collapsing action can occur.

The result is that the draft connections and the spacing member together with the angling connections form a rigid bridge and bracing structure between the front and rear gangs, which positively holds the rear gangs in proper trailing relation. The construction does not interfere with angling the gangs, because the angling feature is combined with the holding feature. The parts are coordinated to work together. The construction does not interfere with the flexibility of the harrow because there is no rigid frame structure to prevent the gangs from adjusting themselves to inequalities in the surface of the ground.

Another feature is that each rear gang tends to counterbalance the thrust of its corresponding front gang. For example, referring to Figure 2, when the harrow is drawn forward, the front gang tends to move inwardly and the rear gang tends to move outwardly. As the right rear gang tends to move outwardly, it tends to swing the draft link 30 about its pivot to the brace 35. The front gang acts in the opposite direction on the draft link 30 tending to counteract movement of the rear gang. Likewise, the angling connection 30 is pushed in one direction by the rear gang and in the other by the front gang. The tendency is, therefore, for these two gangs to counter-balance one another, thereby preventing undue pressure on the bumpers between the ends of the front gangs and serving to make the disks trail more easily in proper position.

It has been found that, under some conditions, there is a tendency for the inner ends of the rear pair of gangs to dig in and cut deeper than the outer ends. This does not occur in normal operation of the harrow, but in turning and in unusual positions. In order to counteract this tendency, a connecting means has been provided comprising two bars 50 and 51 connected respectively to the weight boxes 12 and 13 of the rear gangs by relatively loose connections and converging forwardly and extending loosely through an opening in the standard 26. The two bars are connected together at one point only by a pivot 53, so that they will not move longitudinally relative to one another. These bars cooperate with the spacing bar 35 through an adjustable bearing member 54 located beneath the bars and connected to the cross brace 35, the member 54 being constructed so that it may be adjusted up and down to vary its height. When the inner ends of the rear pair of gangs tend to move downwardly, the bars 50 and 51 contact the member 54, which stops further downward movement, tilting of the front end of the bars 50 and 51 being prevented by reason of the fact that they extend through the opening in standard 26. A certain amount of up and down relative movement of the gangs is desirable and this is permitted because the bars 50 and 51 are connected together by a pivotal connection at the point 53 at only one point. The opening in standard 26 is larger than the cross section of the bars, so that the bars 50 and 51 may have a limited movement in a vertical plane and, consequently, the gangs may move up and down relative to one another to a limited extent. The member 54 is of sufficient length so that the bars 50 and 51 will contact it when the harrow is in working position, as illustrated in Figure 2. As the harrow moves to working position, the bars 50 and 51 must spread to a slight extent, such action being permitted by the resiliency of the bars and by the loose connection to the weight boxes 12 and 13.

Another function of the bars 50 and 51 is to hold the rear gangs steady relative to one another and to prevent them from jerking back and forth due to variations in the character and condition of the soil cut by the respective gangs. Such action is prevented by reason of the fact that the bars are connected together at the point 53. This prevents any backward and forward movement of the inner end of one of the gangs relative to the other and tends to steady them.

Figure 3:
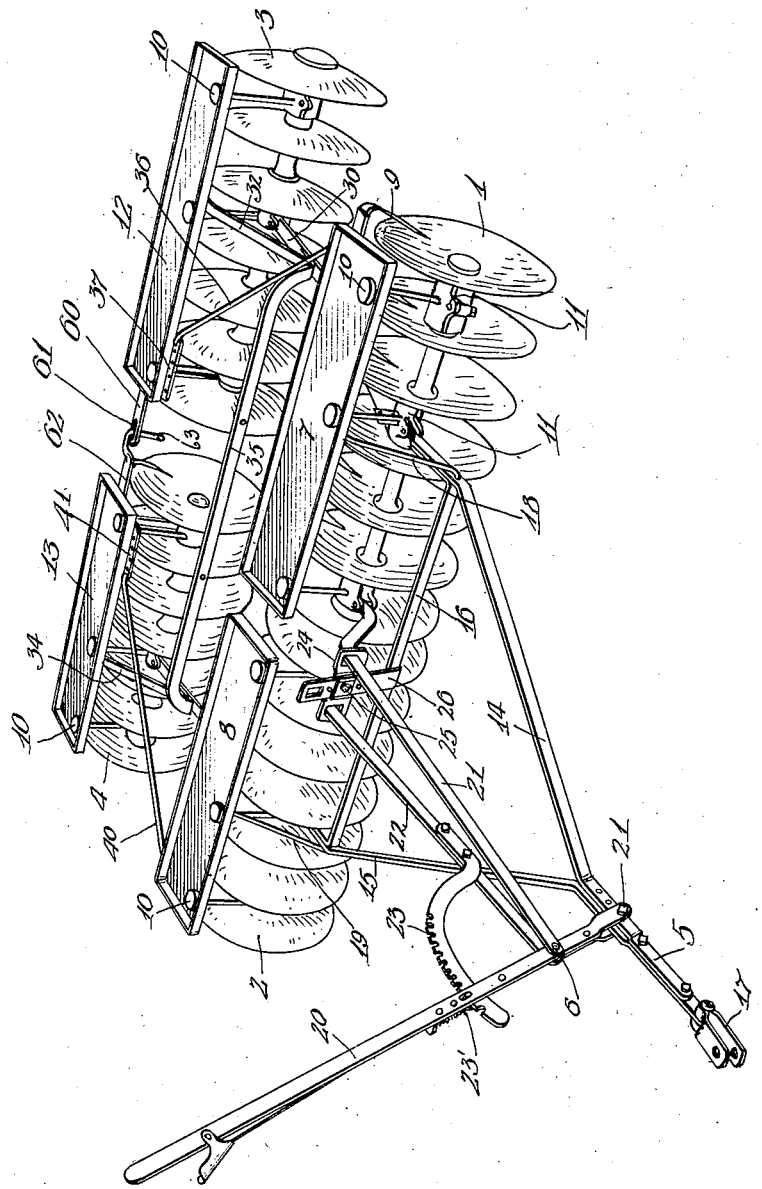
Figure 3 is a perspective view of a modified form of the harrow in transport position.

The modified form illustrated in Figure 3 is similar to the harrow illustrated in Figures 1 and 2, except as to the connection between the inner ends of the rear gangs. In this modification, a bar 60 having a slot 61 is connected to the weight box 12 and a bar 62 having a rounded and bent-down end 63 is connected to the weight box 13. The bent-down end 63 of bar 62 extends through the slot 61 of the bar 60. This connection prevents the inner ends of the gangs from moving back and forth relative to one another and it gives freedom of action when the harrow is moved from working to transport position. This connection is somewhat simpler than the one in the harrow illustrated in Figures 1 and 2 and, where the matter of the inner ends of the rear gangs digging into the ground is not serious, can be used with satisfactory results.

It will be observed that the harrow that has been produced is of extremely simple construction, of neat appearance, and, at the same time, the desirable features in regard to proper trailing and angling of the rear gangs have been obtained. These and other results are all secured by constructing and coordinating the various parts so that each performs a maximum of functions and cooperates with the others to produce efficient results.

It will be understood that variations can be made in the construction without departing from the spirit and scope of the invention as defined in the claims.

I claim:

1. A frameless tandem disk harrow having right and left front gangs, right and left rear gangs, draft connections for the front gangs, means for angling the front gangs, a pivotal draft connection between the right gangs, a pivotal draft connection between the left gangs, a spacing bar between said draft connections, an angling connection between the right gangs, and an angling connection between the left gangs.

2. A frameless tandem disk harrow having right and left front gangs, right and left rear gangs, means for angling the front gangs, cross-link connections between the right gangs for transmitting draft from the front to the rear gang and for angling the rear gang in response to angling movements of the front gang, cross link connections between the left gangs for transmitting draft from the front gang to the rear gang and for angling the rear gang in response to angling movements of the front gang, and spacing means between the cross link connections for the right gang and the cross link connections for the left gang.

3. A frameless tandem disk harrow having right and left front gangs, right and left rear gangs, draft connections for the front gangs, means for angling the front gangs, a pivotal draft connection between the right gangs located at an angle to the longitudinal axis of the harrow, a pivotal draft connection between the left gangs at an angle to the longitudinal axis, spacing means between said draft connections, a connection between the right gangs located at an angle relative to the longitudinal axis opposite to that of the right draft connection, and a connection between the left gangs at an angle relative to the longitudinal axis opposite to the angle of the left draft connection.

4. A tandem disk harrow having right and left front gangs, right and left rear gangs, a draft connection between the right gangs, a draft connection between the left gangs, said draft connections being connected to the respective disk gangs substantially at their center, a link connecting the outer end of the right front gang with the inner end of the right rear gang, a link connecting the outer end of the left front gang with the inner end of the rear left gang, draft connections for the front gangs, and means for angling the front gangs.

5. A tandem disk harrow having right and left front gangs, right and left rear gangs, a draft connection between the right gangs, a draft connection between the left gangs, said draft connections being connected substantially at the center of each of the disk gangs, a link connecting the outer end of the right front gang with the inner end of the right rear gang, a link connecting the outer end of the left front gang with the inner end of the rear left gang, said links being adjustably connected to each of the gangs so that their position may be varied to vary the working angle of the rear gangs without affecting the transport position of the rear gangs, draft connections for the front gangs, and means for angling the front gangs.

6. A frameless tandem disk harrow having right and left front gangs, right and left rear gangs, a pivotal draft connection between the right gangs, a pivotal draft connection between the left gangs, spacing means between the draft connections, a link connecting the outer end of the right front gang with the inner end of the right rear gang, a link connecting the outer end of the left front gang with the inner end of the rear left gang, draft connections for the front gangs, and means for angling the front gangs.

7. A tandem disk harrow having right and left front gangs each having weight boxes, right and left rear gangs each having weight boxes, draft connections for the front gangs, means for angling the front gangs, draft connections between the right gangs, draft connections between the left gangs, spacing means between the right and left draft connections, angling connections between the weight boxes of the right gangs, and angling connections between the weight boxes of the left gangs.

8. A frameless tandem disk harrow having a front pair of gangs, a rear pair of gangs, draft connections for the front gangs, draft connections for the rear gangs, means for angling the gangs, and a member connected to the inner end of each rear gang and extending forwardly and passing loosely through a guide at the front of the harrow, said members being connected together at their forward ends and serving to prevent the rear gangs from moving backward and forward relative to one another but allowing the gangs to be freely angled.

9. A tandem disk harrow having right and left front gangs, right and left rear gangs, draft connections between the right gangs, draft connections between the left gangs, spacing means between the draft connections, an angling connection between the right gangs, an angling connection between the left gangs, draft connections for the front gangs, means for angling the front gangs, and a member connected to the inner end of each rear gang and extending forwardly and passing loosely through a guide at the front of the harrow, said members being positioned so as to contact an adjustable stop on said spacing means to limit their downward movement and being connected together at their forward ends.

10. A tandem disk harrow provided with right and left front gangs each having weight boxes, right and left rear gangs each having weight boxes, draft connections for the front gangs, means for angling the front gangs, draft connections between the right gangs, draft connections between the left gangs, spacing means between the right and left draft connections, angling connections between the weight boxes of the right gangs, angling connections between the weight boxes of the left gangs, and means connected to the inner ends of the rear gangs adapted to bear on the spacing means and operatively associated with the front draft connections for preventing the inner ends of the rear gangs from disking deeper than the outer ends.

11. A tandem disk harrow having right and left front gangs, right and left rear gangs, a draft connection between the right gangs, a draft connection between the left gangs, spacing means between the draft connections, a link connecting the outer end of the right front gang with the inner end of the right rear gang, a link connecting the outer end of the left front gang with the inner end of the rear left gang, draft connections for the front gangs, means for angling the front gangs, an adjustable abutment carried by the spacing means, and members connected to the inner ends of the rear gangs and extending forwardly in position to contact the abutment carried by the spacing member whereby the inner ends of the rear gangs are prevented from digging deeper than the outer ends, said members being connected together at their front end to prevent the inner ends of the gangs from jerking back and forth relatively to one another but being constructed so as to permit the gangs to be angled from working to transport position and vice versa.

12. A tandem disk harrow having right and left front gangs, right and left rear gangs, a draft connection between the right gangs, a draft connection between the left gangs, spacing means between the draft connections, a link connecting the outer end of the right front gang with the inner end of the right rear gang, a link connecting the outer end of the left front gang with the inner end of the rear left gang, a draft frame for the front gangs, means connected to the inner ends of the front gangs for angling them, an adjustable abutment carried by the spacing means, members connected to the inner ends of the rear gangs and extending forwardly in position to contact the abutment, said members being connected together at their forward ends and extending through an opening in a standard carried by the draft frame, said standard also carrying a compensating member connected with the angling means for the front gangs to throw one of the inner ends up as the other goes down.

13. A tandem disk harrow provided with right and left front gangs each having weight boxes, right and left rear gangs each having weight boxes, draft connections for the front gangs, means for angling the front gangs, means associated with the angling means and draft connections to counter balance the inner ends of the front gangs, a draft connection between the right gangs, a draft connection between the left gangs, said last two draft connections being oppositely inclined to the longitudinal axis of the harrow, spacing means between the right and left draft connections, an angling connection between the outer end of the front right gang and the inner end of the rear right gang, an angling connection between the outer end of the front left gang and the inner end of the rear left gang, bars connected to the inner ends of the rear gangs, and an adjustable bearing member carried by the spacing means on which the bars are adapted to rest to prevent the inner ends of the rear gangs from disking deeper than the outer ends.

In testimony whereof, I affix my signature.

JOSEPH E. BODA.